C. L. KOERNER.
MOTOR METER LOCK.
APPLICATION FILED JUNE 4, 1919.
1,334,500.
Patented Mar. 23, 1920.
Fig.1.
Fig.2.
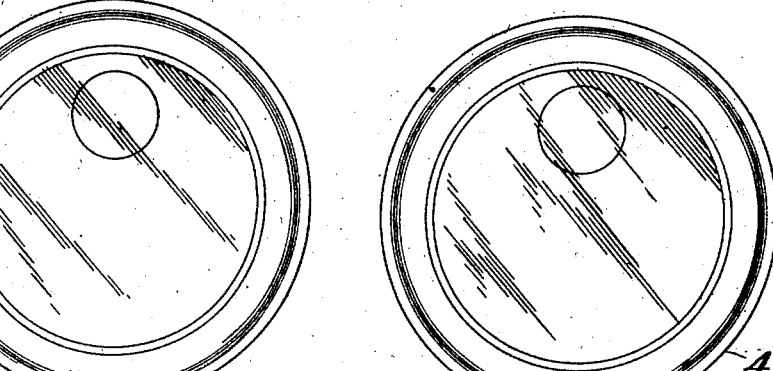
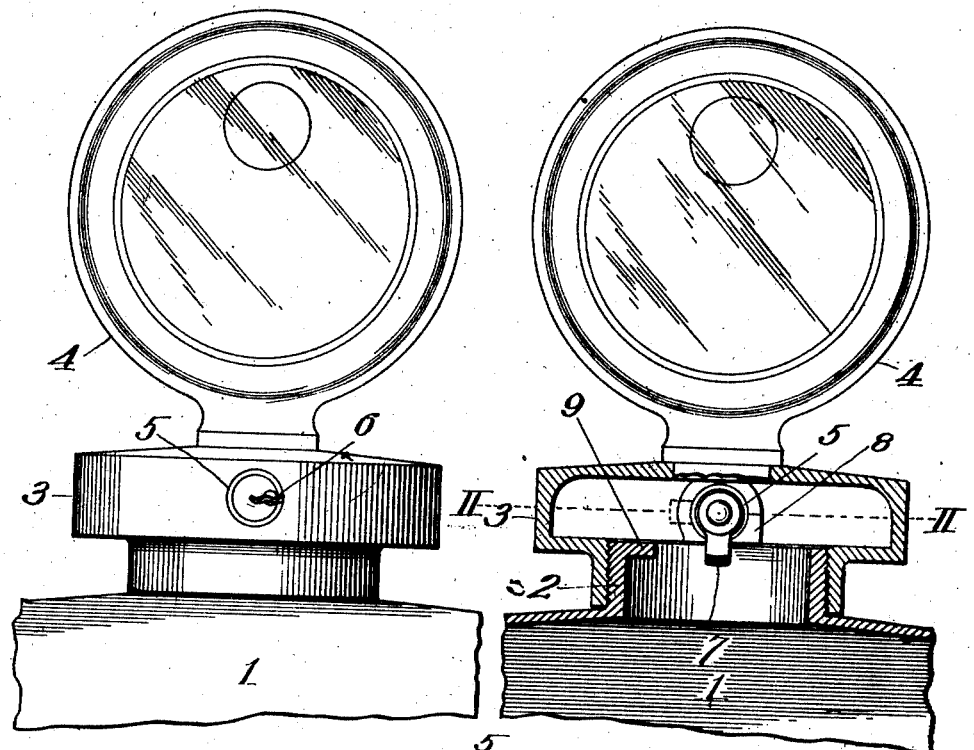
Fig.3.
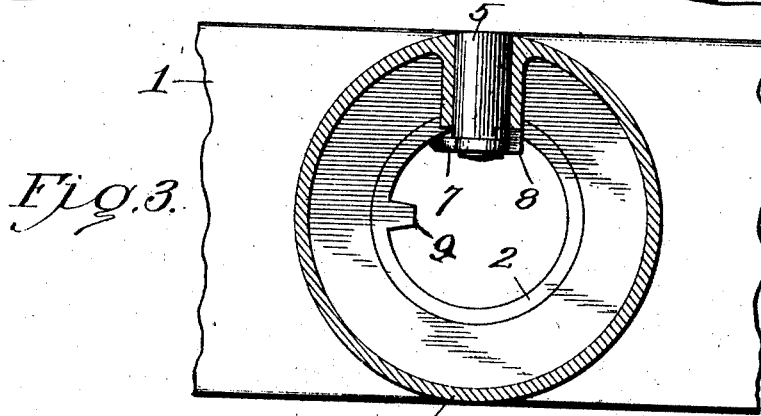
Inventor:
C. L. Koerner.
By George␣ Thorpe
atty.

UNITED STATES PATENT OFFICE.

CHARLES L. KOERNER, OF KANSAS CITY, MISSOURI, ASSIGNOR OF ONE-HALF TO WILLIAM S. REID, OF KANSAS CITY, MISSOURI.

MOTOR-METER LOCK.

1,334,500. Specification of Letters Patent. Patented Mar. 23, 1920.

Application filed June 4, 1919. Serial No. 301,722.

*To all whom it may concern:*

Be it known that I, CHARLES L. KOERNER, a citizen of the United States, residing at Kansas City, in the county of Jackson and State of Missouri, have invented certain new and useful Improvements in Motor-Meter Locks, of which the following is a specification.

This invention relates to motor meter locks, and has for its special object to produce efficient but inconspicuous means for securing radiator caps against unauthorized removal, for the protection against theft of motor meters mounted on such caps.

To this end the invention consists in certain novel and useful features of construction and combinations of parts as hereinafter described and claimed; and in order that it may be fully understood reference is to be had to the accompanying drawing, in which:

Figure 1, is a rear view of the upper part of a motor car radiator equipped with a motor meter lock embodying the invention.

Fig. 2, is a view showing the neck of the radiator and the cap therefor in section, the locking stem of the motor meter being broken away.

Fig. 3, is a horizontal section taken on the line III—III of Fig. 2.

In the said drawing, 1 indicates a radiator of any suitable or preferred type, and 2 is the threaded neck or filling stem thereof.

3 is a cap for screwing upon said neck or stem, and 4 a motor meter securely fastened to said cap in any suitable or preferred manner.

The cap 2 is provided with a radially arranged lock 5, the same being preferably of and shown as the cylinder type for actuation by a special key inserted at the key hole 6. This type of lock comprises a shell and a member rotatable when unlocked, and this rotatable member is provided at its inner end with an arm 7 which when locked extends downward, and can not be swung beyond that point because of a stop lug 8 cast with the cap.

When the cap is screwed upon the neck or stem, the arm 7 is in unlocked position as shown by dotted lines in Fig. 2, so that it can be screwed home without coming into conflict with the stop lug 9 projecting from the neck or stem. After the cap has been fully screwed upon the stem, the lock can turn to dispose the arm 7 in vertically pendant position, and when this adjustment is effected and the key removed from the lock, the cap can not be unscrewed because the arm 7 will strike and be arrested by the stop lug 9 before one complete revolution of the cap can take place.

To unscrew the cap, the key must be inserted to adjust the lock to dispose the arm in a horizontal position, after which the cap is free to be unscrewed to give access to the radiator or for any other purpose.

From the foregoing it will be apparent that I have produced a motor meter lock which will protect the cap and motor meter from removal, and which can be easily and economically applied to the radiators of any of the approved cars. It is, of course, apparent that the detailed construction of the lock outside of the fact that it must have a rotating arm, such as arm 7, may be varied—in fact may be of the Yale or any other approved type—the distinctive feature of this lock being that its operative mechanism is within the cap and hence inaccessible to anyone lacking the proper key.

I claim:

1. The combination of a radiator having a neck, a cap removably secured thereon, a motor meter mounted on the cap, and removable therewith from the radiator, a lock set in the cap and provided with an adjustable locking arm, and a lug on said neck to occupy the path which said arm must take to remove the cap while said arm is in locked position.

2. The combination of a threaded radiator neck provided with a lug, a motor-meter-carrying cap to screw upon said neck, and a cylinder lock set in the cap, provided with an arm for adjustment behind and to be arrested by said lug should the cap be turned without unlocking the arm.

3. The combination of a threaded radiator neck provided with a lug, a motor-meter-carrying cap to screw upon said neck and also provided with a lug, and a cylinder lock set in the cap, provided with an arm, for adjustment to depending or locking position against the lug of said cap and adapted to abut against the lug of said neck in the event of an attempt to unscrew the cap from the said neck.

In testimony whereof I affix my signature.

CHAS. L. KOERNER,